Sept. 17, 1940.                W. W. REECE                2,215,193
    METHOD OF AND APPARATUS FOR COOLING, SLICING, AND WRAPPING
         BREAD AND THE LIKE IN CONTROLLED ATMOSPHERE
                   Filed Sept. 23, 1937        2 Sheets-Sheet 1
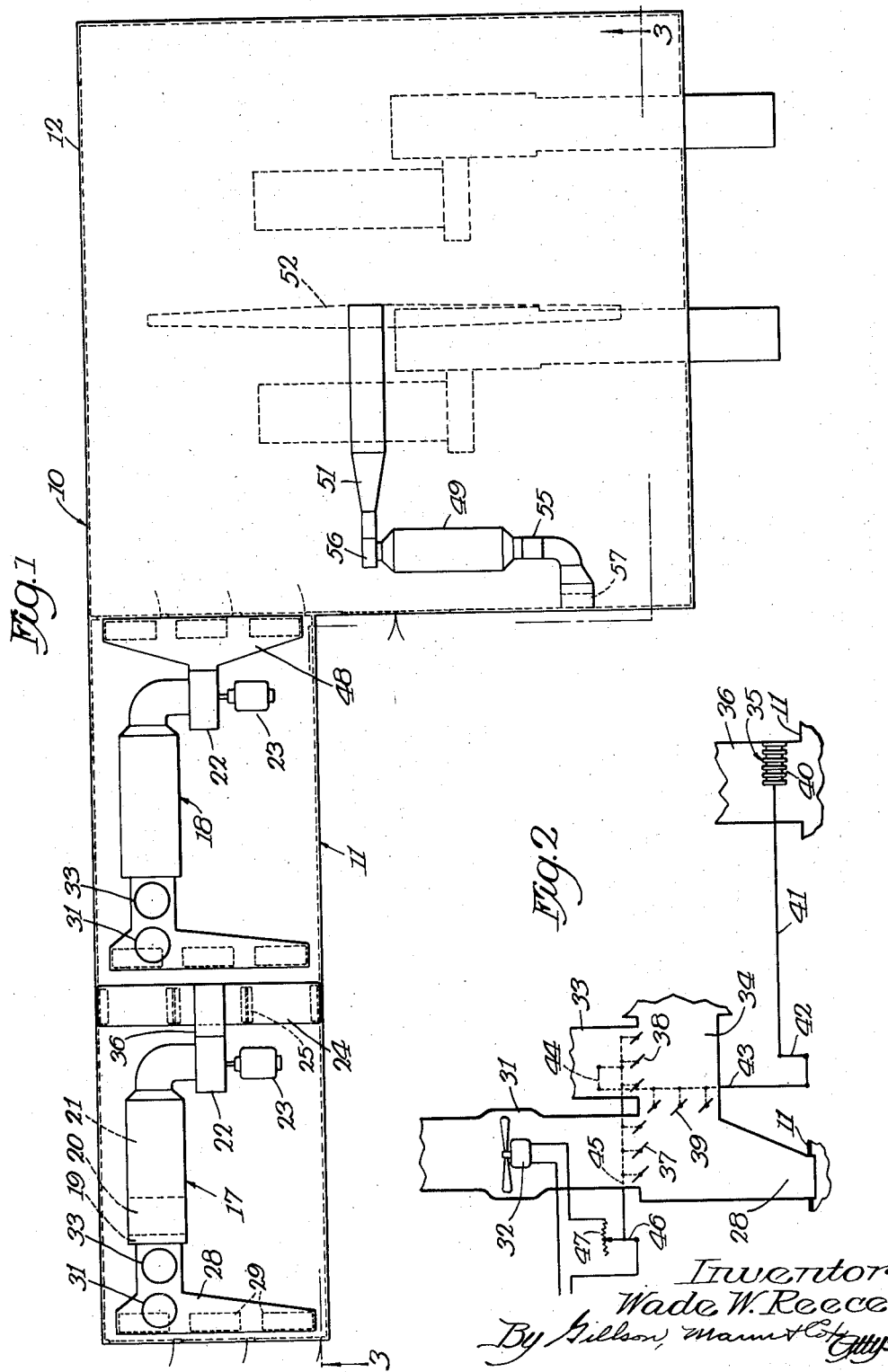

Sept. 17, 1940.  W. W. REECE  2,215,193
METHOD OF AND APPARATUS FOR COOLING, SLICING, AND WRAPPING
BREAD AND THE LIKE IN CONTROLLED ATMOSPHERE
Filed Sept. 23, 1937  2 Sheets-Sheet 2
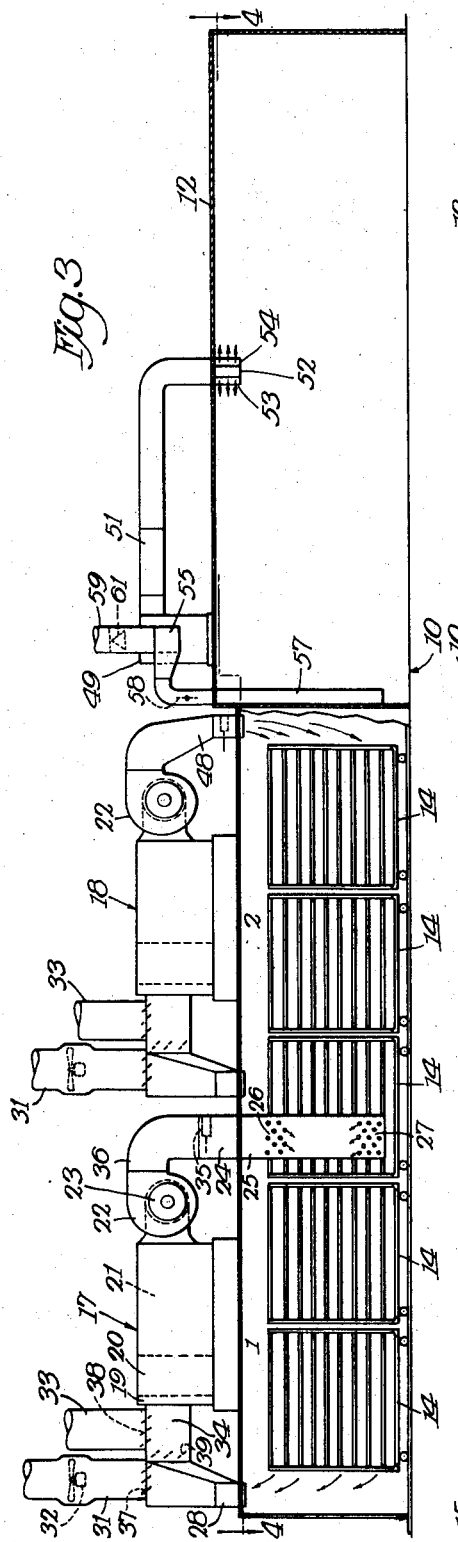
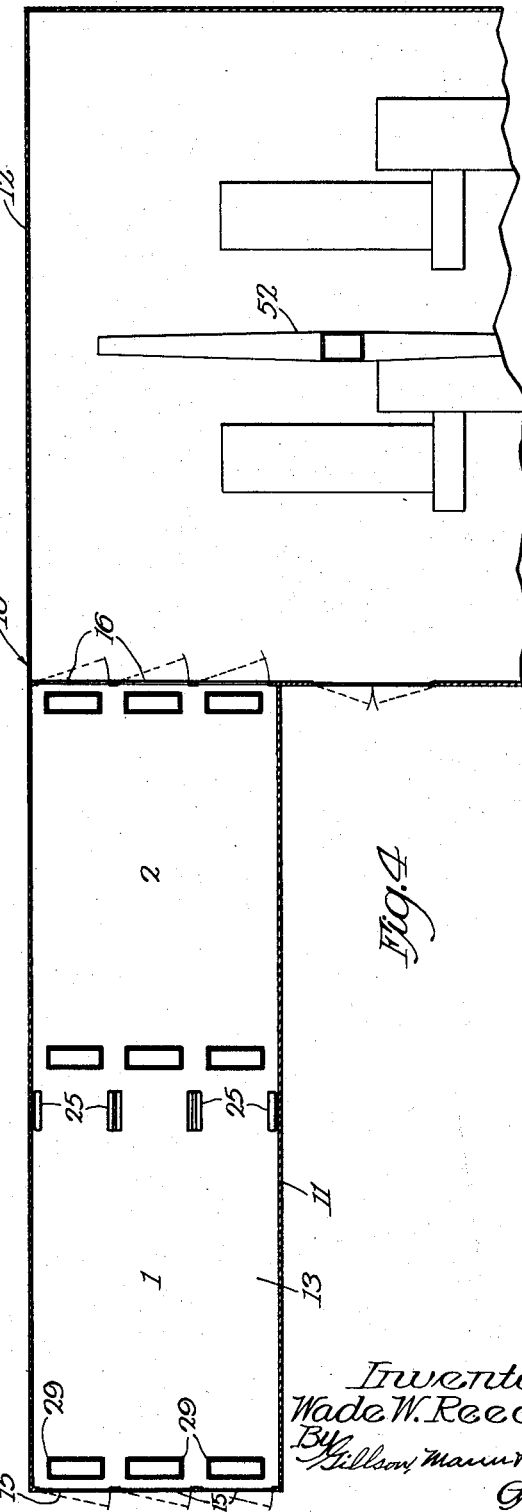
Inventor:
Wade W. Reece
By Gibson, Mann & Cox
Attys.

Patented Sept. 17, 1940

2,215,193

UNITED STATES PATENT OFFICE 2,215,193

METHOD OF AND APPARATUS FOR COOLING, SLICING, AND WRAPPING BREAD AND THE LIKE IN CONTROLLED ATMOSPHERE

Wade W. Reece, Chicago, Ill., assignor to The W. E. Long Company, Chicago, Ill., a corporation of Illinois Application September 23, 1937, Serial No. 165,346

12 Claims. (Cl. 107—54)

This invention relates to method of, and apparatus for, cooling bakery products and has for one of its objects the provision of a new and improved apparatus having means for supplying air at a predetermined temperature and moisture content to the cooling chamber at one portion thereof and for supplying air conditioned differently to another portion of said chamber during the cooling operation.

A further object of the invention is the provision of a new and improved method of cooling bakery products by treating the same in different zones or portions of the cooling chamber with air having different heat and moisture characteristics.

A still further object of the invention is the provision of a new and improved apparatus having a novel arrangement of means for controlling the temperature and moisture content of the air employed in the cooling operation of bakery products.

Another object of the invention is the provision of new and improved apparatus for cooling bread and other bakery products that is simple in construction, inexpensive to install, that may be operated at comparatively low costs and that is efficient in operation.

Another object of the invention is the provision of a new and improved apparatus for cooling, slicing and wrapping bread and like products in controlled atmospheres.

Other and further objects and advantages of the invention will appear from the following description, taken in connection with the accompanying drawings, in which—

Fig. 1 is a plan view of the apparatus;

Fig. 2 is a diagrammatic view of the mechanism for controlling the flow of the air;

Fig. 3 is a section on the line 3—3 of Fig. 1; and

Fig. 4 is a horizontal section on the line 4—4 of Fig. 3.

In the use of cooling chambers for artificially cooling bakery products, it has been found that a more desirable and a more uniform product may be obtained, if the air circulated within the cooler be conditioned as to temperature and moisture. If, for instance, the air that first strikes the hot bread be too dry and its temperature be too low, the bread crust will check whereas this same air in a section of the tunnel where the bread is cooler would not be subject to this same objection. On the other hand, air containing too much moisture in the section of the tunnel where the final stage of cooling is accomplished will result in a soggy crust.

Considering the chamber as being divided into imaginary zones or sections, good results may be obtained by supplying each zone with air differently conditioned as to temperature and relative moisture content. The air supplied to the products while in their hottest condition may flow across those products at a lower velocity than in the zone, for instance, where the final cooling takes place. Furthermore, certain products requiring different hardness of crust must be treated differently from those products having softer crust.

The present invention seeks to provide an apparatus for, and method of, cooling bakery products of various types in such a manner as to secure the desired results for the particular type of product and the results desired. The apparatus employed is provided with means independently for controlling the condition of the air as to its temperature and moisture content as well as its velocity through the different cooling zones.

Referring now to the drawings, the reference character 10 designates generally a combined bread cooling and wrapping apparatus comprising the cooling chamber or tunnel 11 and the wrapping room 12. The wrapping room 12 is adjacent to the delivery end of the tunnel 11 and is in communication therewith. The cooling tunnel is an elongated channel or chamber 13, as is usual in such constructions. In the form shown, the tunnel is three racks wide and five racks long. It may therefore be considered to have three lanes or lines along which the bread carriers or racks move.

In cooling bread and other bakery products, the same are placed on racks such as the racks 14 in Fig. 3 and are pushed through the cooling tunnel by hand or inclined tracks may be provided whereby the racks will move by gravity through the cooling tunnel. While in the construction shown, the conventional cooling racks are used, it is understood that any suitable conveyor may be employed. Since the racks are of the usual or conventional construction, it is not thought necessary to further illustrate or describe the same.

The cooling tunnel chamber is provided with doors 15 at the entrance end, one for each lane or row of racks or trucks, and also with swinging doors 16 at the delivery end of the tunnel through which the racks or trucks pass into the wrapping room.

In the operation of the apparatus thus far described, a truck of bread, fresh from the oven, is moved into the cooling chamber behind one of the rows and the entire row pushed forwardly the length of the truck thus forcing the last cooling rack through the corresponding door 16 into the wrapping room. The next rack, with the hot bread, will be moved into the cooling room behind the second row, etc., taking the rows in order.

In the cooling of bread, the character of the crust may be varied at will by controlling the temperature and moisture content of the air and its velocity as it flows across the bread or other bakery products as they pass through the cooling chamber.

In the present invention, the cooling chamber may be considered as being divided into two cooling zones, zone 1 the entrance end and zone 2 the discharge end of the cooling chamber. Each zone is provided with its individual air conditioning apparatus. For the purpose of disclosing the invention, only two sets of this mechanism are disclosed but it is understood that, if desired, additional air conditioning devices may be employed which would form additional cooling zones.

In each of the apparatuses for the two zones shown, means are provided for conditioning fresh air and circulating the same through the cooling chamber. Means are also provided for recirculating a portion or all of the air within that particular zone. As shown on the drawings, the two air conditioning apparatuses 17 and 18 are mounted on the top of the cooling tunnel. These apparatuses may be mounted in any other suitable manner but for convenience of construction, they are usually mounted on the tunnel. The apparatuses 17 and 18 are each provided with means for heating and cooling the air as it passes through the conditioning apparatus. Since the air cleaner or dust screen 19, the heating or cooling apparatus 20, and the humidifier 21 are of the usual or any well known construction, it is not thought necessary to illustrate or describe the same more in detail further than to state that any of the commercial types suitable for such work may be employed.

Each of the air conditioning devices is provided with a blower 22 operated by a variable speed motor 23. By employing a variable speed motor, the velocity of the air discharged from the fan or blower 22 may be controlled by the operator. These blowers cause air to flow through the air conditioners as is well known in such constructions. Since the arrangement of the air conditioning devices and the controls therefor are similar, only one need be described.

In the conditioning device 17, the blower 22 discharges into a header 24 which is provided with a plurality of downwardly extending discharge conduits 25, Fig. 3. Any suitable number of these conduits may be provided and in the form of the construction shown, there is a conduit at each side of the three rack lines or lanes making four conduits in all. In order that these conduits may afford the minimum obstruction to the moving racks, they are in the form of a rectangle in cross-section with the major axis extending longitudinally of the cooling chamber, as shown in Fig. 4. These discharge conduits are preferably provided with discharge outlets 26 and 27 in the sides thereof which may be arranged in spaced relation, the upper conduits being in substantially the horizontal plane of the upper portion of the cooling racks.

An exhaust header 28 is provided at the forward or entrance end of the chamber and is preferably located above the same. This header has a plurality of exhaust conduits 29 extending through the roof of the cooling chamber. Preferably, though not necessarily, these exhaust conduits are arranged directly above the lanes or cooling rack lines. This arrangement of the conduits assures the air passing along the racks and over the products more efficiently than if these exhaust conduits were located between the lanes or cooling rack lines.

A main discharge conduit 31 is provided for discharging a portion or all of the air after it has been through zone 1 of the cooling compartment. In order to assist the discharge, a fan 32 may be mounted in this main discharge conduit, the fan being automatically controlled as will presently appear. The intake for the conditioning device is shown at 33, through which fresh air is supplied to the conditioning device.

Suitable means are provided for recirculating all or a portion of the air circulating through zone 1. In the form of the construction shown, a conduit 34 connects the inlet of the conditioning device 17 with the header 28 and is also in communication with the inlet conduit 33.

Appropriate means are provided for automatically controlling the amount of air discharged through the main discharge conduit 31 or is shunted through the conduit 34 to be recirculated. Any suitable means may be provided for this purpose. As shown, a thermostat 35 is placed in the discharge 36 of the fan 22. This thermostat may be of any suitable construction. In the form shown, it is of the type known as metal bellows expansible fluid type. This bellows is adapted to control a set of louvers 37 controlling the amount of air passing along the passage into the main exhaust 31; a set of louvers 38 for controlling the opening and closing of the intake 33; and, a set of louvers 39 for opening and closing the passage 34.

In the construction shown, a bellows 40 containing a volatile composition has a push rod 41, see Fig. 2, attached thereto which in turn is connected to a bell crank 42 to which is attached an operating rod 43 for controlling the opening and closing of the louvers 39. The operating rod 43 is connected to a bell crank 44 which in turn is connected to an operating rod 45 which controls the operation of the two sets of louvers 37 and 38. The rod 45 is connected to the movable element 46 of a rheostat 47 which controls the operation of the exhaust fan 32.

In the operation of the control mechanism, the parts are so arranged that when the temperature of the air passing through the discharge 36 of the fan is above a predetermined amount, it will expand the metal bellows 40 which in turn will operate the bell crank 42 to close the set of louvers 39 and prevent air passing from the header 28 back into the conditioning apparatus for recirculation. At the same time, the louvers 37 and 38 will be opened due to the operation of the bell crank 44. The movement of the rod 45 for opening the louvers 37 and 38 will simultaneously move the movable member 46 of the rheostat and close the circuit through the fan 32 for exhausting the air through the main exhaust 31. Fresh air will then be supplied through the intake 33 to the conditioning device. When the air passing through the thermostat 40 falls below a predetermined amount, the thermostat will contract thereby opening the louvers 39 and closing the louvers 37 and 38 and opening the circuit through the fan 32. The louvers 37, 38 and 39 may take any intermediate position depending upon the condition of the thermostat 35 which is responsive to the temperature of the surrounding air. If desired, the thermostat 40 may be located in the cooling chamber or the entrance from the cooling chamber to the header 28.

The cooling system for zone 2 of the cooling chamber is substantially the same as that described except that the header 48 receiving the discharge from the fan 22 is not provided with conduits extending below the top wall of the cooling chamber. The two air conditioning devices 17 and 18 may be so adjusted that the air supplied to the two zones will differ and both may be independently controlled as to both temperature and relative moisture content. For instance, air supplied to zone 1 may be at a temperature from 85° F. to 90° F. and have a relative humidity of 75 to 80 percent while the air supplied to the second zone or second stage of cooling may have a temperature of 70° F. to 80° F. with relative humidity of 65 to 75 percent. These conditions give satisfactory results but may be varied in either zone as desired.

After the racks or the bakery products are passed through the cooling chamber, they are conveyed to the slicing and wrapping room or chamber 12 where the individual loaves or other products are wrapped and made ready for the market. It is desirable that in this room, the relative humidity be lower than that of the cooling chamber so that the crust will be of proper moisture content when it is enclosed in the wrapper. A separate air conditioning mechanism is employed for this chamber. In this mechanism, the air conditioning device 49 may be substantially the same as the air conditioning device 17 or 18 just described.

The air conditioner 49 is provided with a discharge 51 for discharging the air into a header 52 located in the upper portion of the slicing and wrapping room adjacent the ceiling thereof. The header 52 extends crosswise of the room and is provided with discharge openings 53 and 54 at each side thereof. The intake 55 of the fan 56 of the conditioning device 49 is provided with a conduit 57 having an opening adjacent the floor of the wrapping room. This conduit is provided with a manually controlled damper 58 for controlling the amount of air removed through the conduit 57. The intake opening 55 is also provided with a fresh air intake 59 which is also provided with a damper 61 for controlling the amount of air introduced through the conduit 59. By regulating the dampers 58 and 61, the amount of air recirculated can be controlled as desired. Automatic means may be provided, if desired, for controlling the temperature and moisture content of the air supplied to the slicing and wrapping room.

It is thought from the foregoing taken in connection with the accompanying drawings, that the construction and operation of my device will be apparent to those skilled in the art, and that minor changes in size, shape, proportion and details of construction may be made without departing from the spirit and scope of the appended claims.

I claim as my invention:

1. A method of cooling bakery products that comprises treating the products fresh from the oven with air having a relative predetermined humidity and a predetermined temperature, and finishing the cooling process by treating the products with a current of air of less relative humidity and lower temperature.

2. A method of cooling bakery products which comprises treating the products while still hot from the baking operation with a current of air at a temperature of from 85° to 90° F. and having a relative humidity of from 75 to 80 per cent, and then treating the partially cooled products with a current of air at a temperature of from 70° to 80° F. with relative humidity of from 15 to 75 per cent for finishing the cooling operation.

3. A method of cooling bakery products which comprises causing a current of air from one source at a predetermined temperature and moisture content to flow over said products during the initial cooling operation, and causing a current of air from another source to flow over said products at a higher velocity and lower cooling temperature for finishing the cooling operation.

4. A method of treating bakery products fresh from the oven which comprises causing a current of air of a predetermined temperature and moisture content to flow over said product hot from the oven, then causing another current of air of a predetermined temperature and moisture content below that of the first-named air to flow over said products, and then wrapping said products in air having a moisture content lower than that of either of said currents of air.

5. An apparatus for treating bread and other bakery products fresh from the baking oven comprising a cooling chamber, a plurality of air conditioners to supply air differently conditioned as to heat or moisture to different zones of the cooling chamber for cooling said products, and separate means in said zones for reconditioning and for recirculating the air in the different zones, respectively.

6. An apparatus for treating baker products fresh from the baking oven comprising means for conveying said products through said oven, means for causing air of a predetermined temperature to circulate within a zone of said chamber for initially cooling said products, a second means for supplying air of a predetermined temperature and moisture content less than that of the first-mentioned air to another zone of said chamber, and means for reconditioning and for recirculating air through the first-named zone.

7. In an apparatus for cooling bread, a cooling chamber, means for conducting bread through said chamber, means for delivering air having a predetermined temperature and moisture content adjacent to the floor at the central portion of said chamber and for removing said air from the upper portion of said chamber adjacent one end thereof and for recirculating the same, and means for circulating and recirculating air having a lower temperature and a lower moisture content through the opposite end of said chamber for finishing the cooling operation, said last-named air being recirculated independently of said first-named air.

8. In an apparatus for cooling bread comprising a cooling chamber having a plurality of lanes along which bread carriers travel, air conditioning apparatus at one end portion of said chamber, ducts extending downwardly between said lanes and having discharge openings therein for discharging conditioned air from said conditioning apparatus into said chamber, exhaust ports adjacent the entrance end of said chamber, and a second air conditioning apparatus having discharge conduits for discharging conditioned air into said chamber vertically above said lanes at the opposite end of said chamber and having exhaust ports adjacent the central portion of said chamber.

9. A method of air conditioning a combined cooling chamber and wrapping room for bakery products which comprises delivering and maintaining air differently conditioned as to temperature and moisture at different points along the chamber and room, maintaining the air at the discharge end of the cooling chamber at a lower temperature and moisture content than at the entrance end and causing the same to flow at higher velocity across the product than at the entrance end of the chamber and maintaining the air within said wrapping room at a still lower temperature and moisture content during the wrapping operation whereby the crust of said product will be of proper moisture content when it is enclosed in the wrapper.

10. In an apparatus for cooling bakery products which comprises a long cooling tunnel and a plurality of air conditioning devices for delivering at different zones along said tunnel, air conditioned differently as to both temperature and moisture, respectively, and for reconditioning and for recirculating said air through said different zones, respectively.

11. A method of cooling bakery products which comprises causing a current of air conditioned as to both temperature and moisture to flow over said products, fresh from the oven, at a low velocity, and then causing a current of air conditioned as to both temperature and moisture but with lower temperature to flow at a higher velocity over the partially cooled product.

12. A process of cooling bakery products which comprises treating the products hot from the oven with air controllably conditioned to have a predetermined temperature and a predetermined moisture content throughout the mass of air at the beginning of the treatment, and then finishing the cooling operation by treating the products with a separate body of air controllably conditioned to have a lower temperature than the first-named air and a moisture content determined by the final desired moisture content of the products relative to the moisture content left therein by the first named air.

WADE W. REECE.